Oct. 14, 1958 B. R. COLEMAN ET AL 2,856,578

MAGNETIC AMPLIFIER WITH CONSTANT MAGNETIC FLUX BIAS

Filed Aug. 21, 1953

INVENTOR.
BENNY R. COLEMAN
MORRISON G. KITCHEN
BY
M. A. Hobbs
ATTORNEY

United States Patent Office 2,856,578

Patented Oct. 14, 1958

2,856,578

MAGNETIC AMPLIFIER WITH CONSTANT MAGNETIC FLUX BIAS

Benny R. Coleman and Morrison G. Kitchen, South Bend, Ind., assignors to Bendix Aviation Corporation, South Bend, Ind., a corporation of Delaware Application August 21, 1953, Serial No. 375,764

9 Claims. (Cl. 323—89)

This invention relates to magnetic amplifiers and more particularly to a means for altering the output characteristic of a magnetic amplifier through the utilization of a novel biasing structure. The biasing of magnetic amplifiers has usually been accomplished through the use of a special direct current control winding but this method has the disadvantage of requiring a separate power source. It is, therefore, an object of the present invention to provide an amplifier which has a bias source not requiring a power supply.

It is another object to provide a magnetic amplifier with a bias source which is sturdy and essentially trouble-free.

It is a further object to provide a magnetic amplifier in which the magnitude and polarity of bias are easily adjusted.

Other objects and advantages will be apparent from the following description taken in connection with the accompanying drawings in which.

Figure 1:
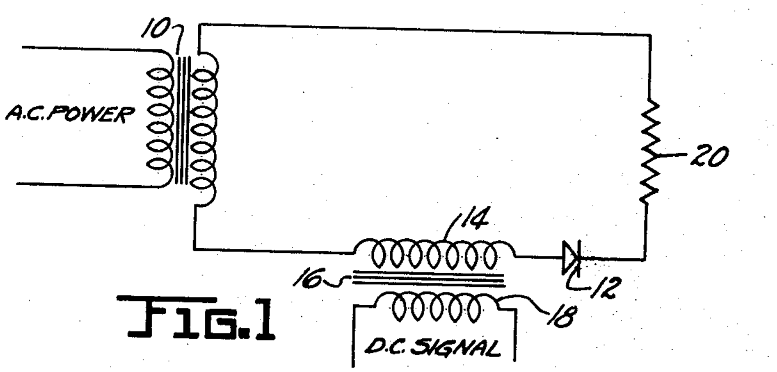
Figure 1 is a schematic diagram of an elementary magnetic amplifier and power supply.

Referring to Figure 1, a source of alternating current is shown applied to the primary winding of a transformer 10. Because of the action of the rectifier 12, a pulsating direct current flows through the power winding 14 which is wound around a reactor or core 16. Also wound on reactor 16 is a direct current signal winding 18. The output of the amplifier is developed across resistor 20.

Figure 2:
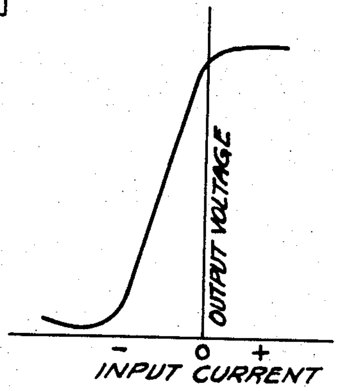
Figure 2 is a curve showing a transfer characteristic of the above amplifier in which input current is shown on the horizontal axis and output voltage on the vertical axis.

Figure 2 illustrates in graphic form the transfer or performance characteristic which may be expected from the amplifier of Figure 1. On the horizontal axis are plotted the values for input current as supplied to direct current winding 18. The vertical axis shows values of output voltage as developed across resistor 20, and the curve indicates the manner in which output voltage varies with input current. It will be noticed that a considerable amount of output voltage is developed at zero input signal. This is because the pulsating direct current power supply is keping reactor 16 in a saturated or nearly saturated condition, thereby reducing the impedance through power winding 14. This results in a high direct current voltage across resistor 20. It will be observed that the slope of the curve to the left of the origin is rather steep. Because of this characteristic, a small direct current input of polarity opposite to that in the power winding causes the amplifier to operate on this steep slope resulting in a very large change in the output voltage. Signal current of the same polarity as that of the power winding will cause very little change in the output because the amplifier will be operating to the right of the knee of the curve.

Figure 3:
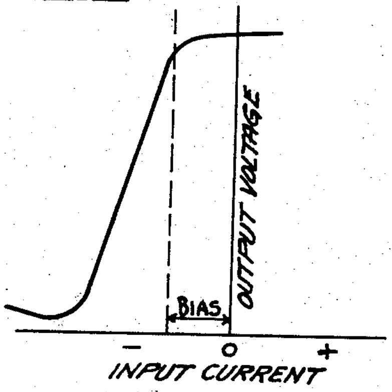
Figure 3 shows the transfer characteristic curve of Figure 2 shifted in position as a result of a biasing signal.

In some applications it is desired that the direct current signal produce these large changes in the output voltage only after reaching some predetermined value. For such applications means are devised to operate the magnetic amplifier along the curve shown in Figure 3. A biasing signal of the same polarity as the input current has the effect of shifting the vertical axis to the right relative to the transfer curve. The dotted vertical line is in the same position relative to the curve of Figure 3 as is the vertical axis of Figure 2. The distance between the dotted line and the vertical axis of Figure 3 represents the amount of positive bias. It will be seen that a negative direct current signal will have very little effect upon the output voltage unless it exceeds the magnitude of the positive bias. When the negative direct current signal is greater than the bias, the amplifier operates on the steeply sloped portion of the curve and, as in the case of Figure 2, small changes in signal current will produce large changes in output voltage.

Figure 4:
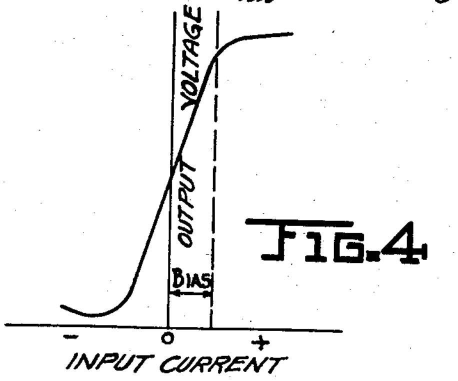
Figure 4 shows the transfer curve of Figure 2 shifted by a biasing signal of polarity opposite to that of Figure 3.

It sometimes is desirable that a magnetic amplifier give substantial response to both positive and negative signals, rather than just to negative signals as in Figure 2. In such a case, a biasing signal of opposite polarity to the input signal can be used to shift the vertical axis toward the left relative to the transfer curve. Examination of Figure 4 shows that an input signal of either polarity causes large changes in output voltage.

Figure 5:
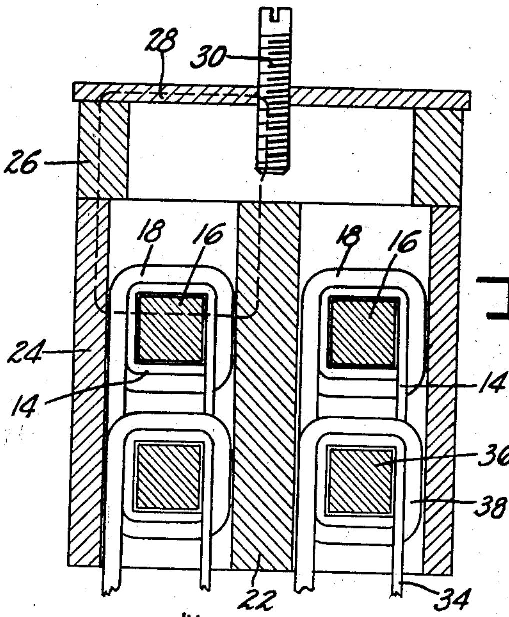
Figure 5 illustrates a sectional view of one form of the invention associated with a basic magnetic amplifier of the type schematically pictured in Figure 1.

The biasing of a magnetic amplifier can be done by any means which has the shifting effect described above. The usual method is by the use of a separate control winding carrying a constant direct current. Another method is to supply a steady source of direct current which bucks the direct current of the control winding and must be overcome if the output voltage is to change significantly. The device of the present invention secures the biasing effect of a steady direct current on a separate control winding by the use of a permament magnet with an adjustable air gap. With reference to Figure 5, it will be understood that the components having numbers corresponding to the numbers of Figure 1 are the same as those shown in Figure 1. A power winding 14 is shown wound on reactor or core 16, said power winding being supplied with a source of pulsating direct current. Also wound on core 16 is a direct current signal winding 18. Current flowing through power winding 14 keeps toroidal reactor 16 in a state of saturation or near saturation unless acted upon by a demagnetizing force, which in this instance is supplied by the direct current signal on winding 18. Through the center of reactor 16 is positioned a soft iron bar 22 and all of the above are enclosed in an iron or steel case 24. Adjacent to case 24 is an annular permanent magnet 26 the faces of which differ in polarity. A flat steel plate 28 covers the opposite face of the permanent magnet and is provided with a threaded passageway in which an adjusting screw 30 of magnetic material is placed. The dotted lines trace a path of lines of flux which flow as a result of the action of permanent magnet 26. It will be apparent that the closed loop is almost entirely established through magnetic material except for the air gap between adjusting screw 30 and the soft iron bar 22. As the length of this air gap is varied by adjusting screw 30, the reluctance of the magnetic path is changed. The flux due to the action of magnet 26 which crosses reactor 16 is believed to cross it in a direction essentially perpendicular to that of the main flux which follows the annular shape of the core. It has been determined that a permanent magnet, when so placed relative to a reactor, has an effect on the flux in the reactor similar to that produced by a steady direct current on a control winding. It has also been determined that to reverse the polarity of the magnet reverses the polarity of the bias. In this way it will be seen that the transfer characteristics of either Figure 3 or Figure 4 can be achieved by reversing the ring magnet and adjusting the screw 30 until the desired magnitude of bias is reached. An additional reactor 36 is shown in case 24 having associated therewith a power winding 34 and a signal winding 38. This reactor may be used in a circuit related to reactor 16 as in the case where both are used in an inverse-parallel and/or full wave system or it may be used in an unrelated circuit. In either case the biasing effect is the same.

It will be apparent to those skilled in the art that the principles herein disclosed may be embodied in devices of greatly varying physical dimensions and relationships. It may be desirable to place a plurality of cores and their associated windings in one casing and bias all of them with one permanent magnet. Or several amplifiers like that shown, may be used to form a system. Other modifications may be made to suit requirements without departing from the scope of the present invention.

We claim:

1. In a magnetic amplifier comprising a source of alternating current, a power winding connected to said source, an annular reactor upon which said power winding is wound, a signal winding wound on said reactor, a rectifier in series with said power winding, and a load in series with said rectifier and power winding: a bar of magnetic material located axially of and in close proximity to said annular reactor; a cylindrical casing of magnetic material enclosing said reactor, the windings thereon, and said bar; a permanent magnet forming part of said casing; an end plate of magnetic material covering one end of said casing; and a bolt threadedly engaged with said end plate for varying the length of the air gap between said bar and said bolt.

2. In a magnetic amplifier comprising a source of alternating current, a power winding connected to said source, a reactor of magnetic material inductively related to said power winding, a signal winding inductively related to said reactor, a rectifier in series with said power winding, and a load connected in series with said rectifier and said power winding; a casing of magnetic material substantially enclosing said reactor and said windings forming a nearly closed path of magnetic material with said reactor; a permanent magnet in said casing and forming part of said path; and means for varying the relctuance of the magnetic path including said permanent magnet.

3. In a magnetic amplifier containing an annular reactor, a power coil wound on said reactor and a signal coil wound on said reactor; a soft iron bar coaxial with and passing through the center of said reactor; a cylindrical casing of ferrous material surrounding said reactor, said windings, and said bar; a ring-shaped permanent magnet having two faces of opposite polarity and having one face adjacent said casing; an end plate of ferrous material adjacent the other face of said magnet; and an adjusting screw threadedly engaged with said end plate for varying the length of the gap between said screw and said soft iron bar.

4. In a magnetic amplifier containing an annular reactor, a power coil wound on said reactor, and a signal coil wound on said reactor; a soft iron bar coaxial with and passing through the center of said reactor; a cylindrical casing of ferrous material surrounding said reactor, said windings, and said bar; a ring-shaped permanent magnet having two faces of opposite polarity and having one face adjacent said casing; and an end plate of ferrous material adjacent the other face of said magnet.

5. In a magnetic amplifier containing a plurality of annular reactors, a power coil wound on each of said reactors, and a signal coil wound on each of said reactors: a soft iron bar coaxial with and passing through the center of said reactor; a cylindrical casing of ferrous material surrounding said reactors, and windings, and said bar; a ring-shaped permanent magnet having two faces of opposite polarity and having one face adjacent said casing; an end plate of ferrous material adjacent the other face of said magnet; and an adjusting screw threadedly engaged with said end plate for varying the length of the gap between said screw and said soft iron bar.

6. In a magnetic amplifier containing a plurality of annular reactors, a power winding wound on each of said reactors, and a signal coil wound on each of said reactors: a soft iron bar coaxial with and passing through the center of said reactors; a cylindrical casing of ferrous material surrounding said reactors, said windings, and said bar; a ring-shaped permanent magnet having two faces of opposite polarity and having one face adjacent said casing; an end plate of ferrous material adjacent the other end of said magnet.

7. In combination, an annular reactor, a signal winding inductively related to said reactor, a source of alternating current, a power coil connected to said source inductively related to said reactor, a rectifier in series with said power coil, a load in series with said power coil and said rectifier, a bar of magnetic material located coaxially with said reactor; a cylindrical casing of magnetic material enclosing said reactor, the windings thereon, and said bar; a ring-shaped permanent magnet adjacent said casing, an end plate of magnetic material covering one end of said magnet, and a bolt threadedly engaged with said end plate for varying the length of the air gap between said bar and said bolt.

8. A magnetic amplifier comprising an annular reactor; a power winding and a signal winding inductively associated with said reactor; a bar of magnetic material positioned coaxially with said reactor; a cylindrical casing of magnetic material around said reactor, said bar, and said windings; a ring-shaped permanent magnet having two faces of opposite polarity, one of said faces being adjacent said cylindrical casing; an end plate of magnetic material adjacent the other of said faces; and a member threadedly engaged with said end plate for varying the length of the air gap between said member and said bar.

9. In a magnetic amplifier comprising a source of alternating current, an annular reactor, a power winding inductively related to said reactor and connected to said alternating current source, a signal winding inductively related to said reactor, and a rectifier in series with said power winding: a bar of magnetic material located coaxially of said reactor; a cylindrical casing of magnetic material surrounding said reactor, said winding, and said bar; a ring-shaped permanent magnet having two faces of opposite polarity, one of said faces being adjacent said cylindrical casing; an end plate of magnetic material covering the opposite face of said magnet; and an adjusting screw threadedly engaged with said end plate for varying the length of the non-magnetic path between said bar and said adjusting screw.

References Cited in the file of this patent

UNITED STATES PATENTS

| | | |
|---|---|---|
| 1,788,152 | Dowling | Jan. 6, 1931 |
| 1,896,510 | Given | Feb. 7, 1933 |
| 2,488,393 | Geiselman | Nov. 15, 1949 |
| 2,603,768 | Trindle | July 15, 1952 |
| 2,694,178 | Smith | Nov. 9, 1954 |
| 2,696,583 | Brown | Dec. 7, 1954 |